C. F. AGNER.
HAY TEDDER ATTACHMENT FOR MOWING MACHINES.
APPLICATION FILED NOV. 23, 1909.
1,002,552.  Patented Sept. 5, 1911.
2 SHEETS—SHEET 2.
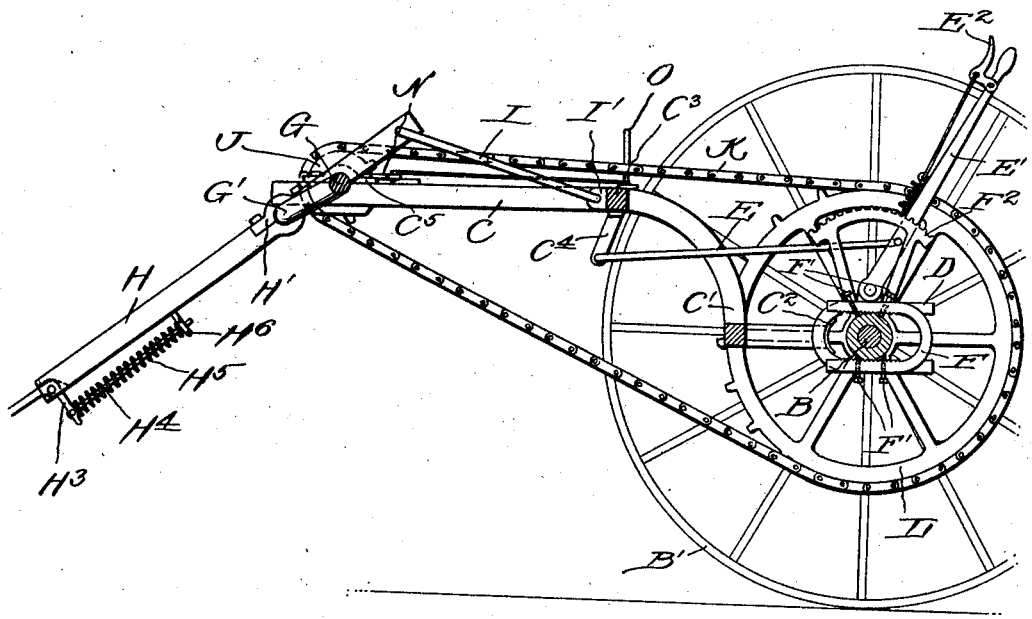
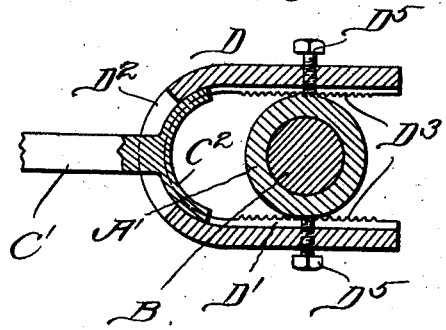
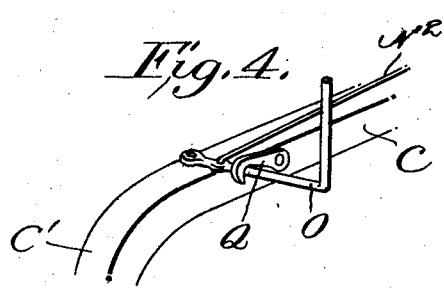
Witnesses
Inventor
C. F. Agner,
By
Attorney

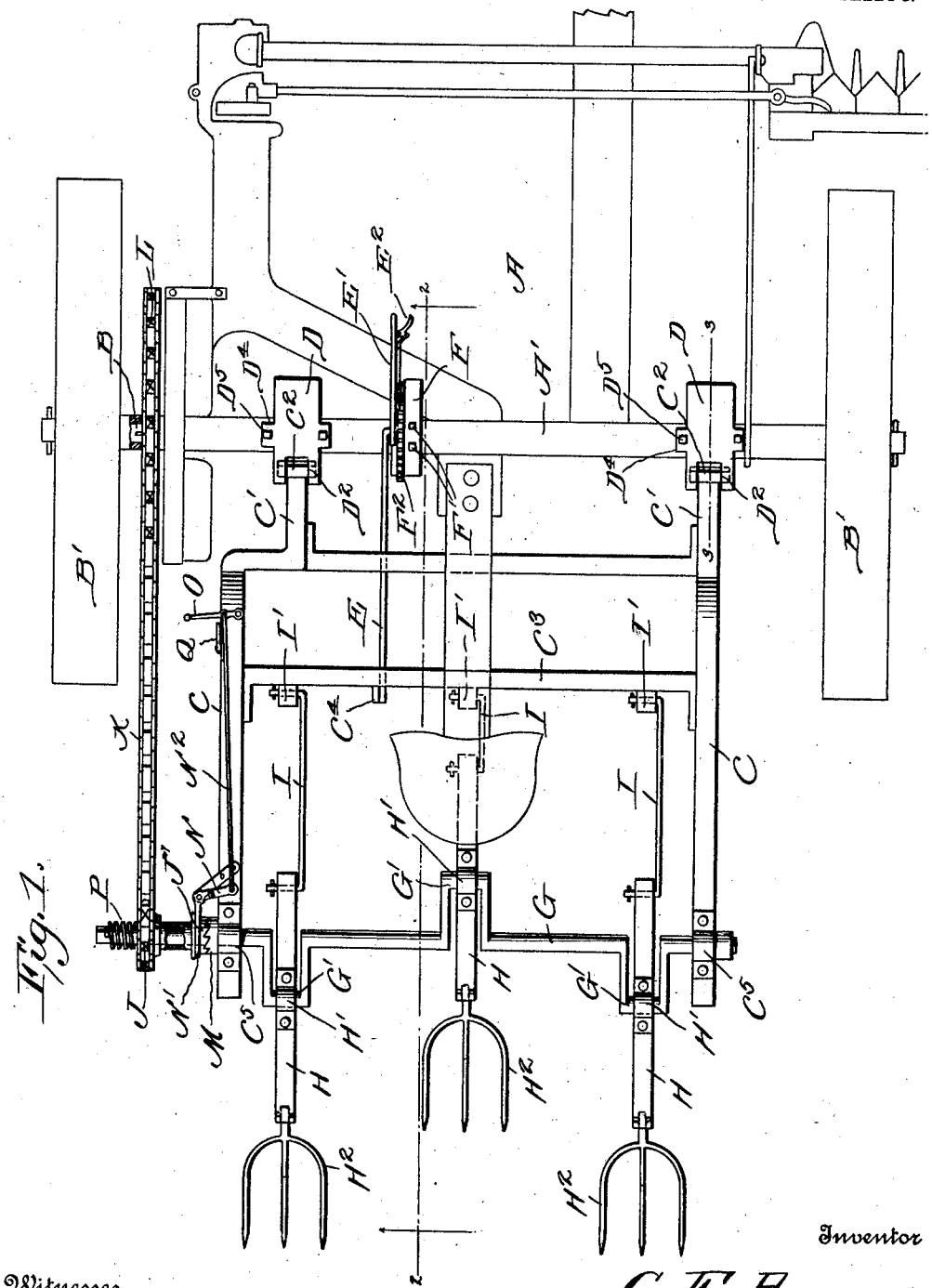

UNITED STATES PATENT OFFICE.

CLARENCE FRANKLIN AGNER, OF STUARTS DRAFT, VIRGINIA.

HAY-TEDDER ATTACHMENT FOR MOWING-MACHINES.

1,002,552.  Specification of Letters Patent.  Patented Sept. 5, 1911.

Application filed November 23, 1909. Serial No. 529,578.

*To all whom it may concern:*

Be it known that I, CLARENCE F. AGNER, a citizen of the United States, residing at Stuarts Draft, in the county of Augusta and State of Virginia, have invented a new and useful Improvement in Hay-Tedder Attachments for Mowing-Machines, of which the following is a specification.

This invention relates to a hay tedder attachment for mowing machines, the object being to provide a tedder which is so constructed that the same can be easily and quickly attached to any of the well-known makes of mowers now in use without changing the parts in any way.

Another object of my invention is to provide fastening members which are carried by the tedder frame in such a manner that they can be readily clamped on the barrel of the mower frame in such a manner that they will be held firmly thereon without any danger of the same becoming detached.

A further object of the invention is to provide means for throwing the tedder forks out of operation so that when the same is being moved from place to place they will be prevented from operating.

Another object of my invention is to provide means for swinging the tedder frame up into such a position that the tedder forks will be held above the ground so that the same can be readily carried.

A still further object of my invention is to provide a tedder which is exceedingly simple and cheap in construction and one which is composed of a very few parts which are so arranged with respect to each other that they are not likely to get out of order in operation.

With these objects in view, my invention consists in the novel features of construction hereinafter fully described, pointed out in the claims and shown in the accompanying drawings, in which:

Figure 1 is a top plan view of my improved tedder showing the same arranged in position on a mowing machine. Fig. 2 is a section taken on the line 2—2 of Fig. 1. Fig. 3 is a section taken on the line 3—3 of Fig. 1, and Fig. 4 is a detail perspective view of a portion of the tedder frame showing the manner of locking the lever for operating the clutch. Fig. 5 is a detail vertical section through the clip.

Referring to the drawing A indicates an ordinary construction of mower frame which is provided with a barrel portion $A'$ in which is mounted the main axle B which is provided with wheels $B'$ at its ends, the above description being given so that the application of my improved tedder can be readily understood.

In carrying out my improved invention, I employ a frame C which is of such a size that it will fit between the wheels of the mower as clearly shown, said frame being provided with depending arm portions $C'$ having semi-circular shaped heads $C^2$ which are adapted to be pivotally mounted within grooves $D'$ formed in substantially U-shaped clips D which are slotted as shown at $D^2$ through which the arms $C'$ extend and said clips are provided with roughened portions $D^3$ adapted to fit over the barrel portion $A'$ of the mower frame A in such a manner that they will be prevented from slipping and for locking the slips D, I provide the same with laterally projecting flanges $D^4$ having threaded bores in which are mounted set screws $D^5$ adapted to engage the top and bottom of the barrel $A'$ and securely lock the clips in position thereon. It will be seen that by this manner the frame C can be readily raised and lowered and for operating the frame I provide the cross bar $C^3$ of the frame with a depending arm $C^4$ to which is connected an operating rod E carried by a lever $E'$ which is pivotally mounted on a clip F secured on the barrel $A'$ by set screws $F'$ and said clip is provided with a segmental rack portion $F^2$ which is adapted to be engaged by a hand lever $E^2$ carried by the lever E for locking the same in its adjusted position and it will be seen that by moving the lever $E'$ the tedder frame C can be raised and lowered.

The rear ends of the tedder frame C are provided with journals $C^5$ in which is mounted a crank shaft G provided with cranks $G'$ on which are pivotally mounted the bearings $H'$ of handles H which are provided with tedder forks $H^2$ at their lower ends and are connected at their upper ends to the cross bar $C^3$ by links I which are pivotally mounted in the upper ends of the handles H and in journal lugs $I'$ formed on the cross bar C so that when the shaft G is operated the forks will be caused to move in such a manner that the hay will be tossed and shaken up so as to spread the same in such a manner that it will thoroughly dry.

For operating the crank shaft G I provide one end of the same with a sprocket wheel J which is loosely mounted thereon over which passes a sprocket chain K carried by a sprocket wheel L which is fixed on the main shaft B of the mower as clearly shown it of course being understood that this sprocket is placed on the axle of the mower before the adjacent wheel is placed thereon and is spaced therefrom by a sleeve or any other suitable means. The sprocket J is provided with a clutch member J' which is adapted to engage a clutch member M fixed on the shaft G so that when thrown into engagement with each other the shaft G will be operated and when thrown out of engagement the sprocket will be allowed to run loose on the shaft G so as to prevent the same from turning and for operating the clutch J' I provide a pivotally mounted lever N provided with a spaced arm N' which fits in a groove formed in the clutch member J' in the ordinary manner and the other arm of the lever is connected to an operating rod N² which extends forwardly and is connected to an operating hand lever O which is locked by a catch Q so that when forced forwardly so as to throw the clutch member J out of engagement with the clutch member M it will be held in that position by the tension of the coil spring P which is mounted on the shaft outside of the sprocket wheel J as clearly shown.

From the foregoing description, it will be seen that I have provided a hay tedder which is so constructed that the same can be attached or detached easily and quickly to a mower and at the same time it will be operated at the same time that the mower is operating without increasing the draft to any extent.

The tedder forks H² are preferably provided with angled ends H³ which are pivotally mounted in bifurcations formed in the handles H, said angled ends H³ carrying pivoted rods H⁴ which are surrounded by coil springs H⁵ and extend upwardly through a guide H⁶ secured to the handles so that when the forks are brought into engagement with an obstruction, the same will yield in order to prevent the same from becoming broken.

Having thus fully described my invention, what I claim as new and desire to secure by Letters Patent, is:

1. A hay tedder attachment for mowing machines comprising a pair of substantially U-shaped clips provided with grooves communicating with slots formed in said clips, of a tedder frame provided with depending arm portions having semi-circular heads mounted in the grooves of said clips, set screws for securing said clips to the frame of the mower, a crank shaft mounted on said tedder frame, tedder forks carried by said crank shaft, and sprockets operated by a sprocket chain for operating said crank shaft.

2. The combination with a mower having a barrel portion, of a pair of U-shaped clips provided with roughened portions and secured upon said barrel portion by set screws, said clips being each provided with an annular groove on its inner face communicating with a slot formed in the closed end of the clip, a tedder frame provided with depending arm portions extending through the slots of said clips having semi-circular head members loosely mounted within the grooves of the clips, and a second clip fixed on the barrel of the mower frame carrying a lever having an operating rod connected thereto and connected to the tedder frame for raising and lowering the same.

CLARENCE FRANKLIN AGNER.

Witnesses:
JNO. B. HUNTER,
H. D. MILLER.

Copies of this patent may be obtained for five cents each, by addressing the "Commissioner of Patents, Washington, D. C."